LATHE SYSTEM OR THE LIKE

Filed Sept. 29, 1951 8 Sheets-Sheet 1

INVENTORS
CHARLES W. HEPPENSTALL
HARRY J. ROSS AND
FREDERICK F. ROHRER, JR.
by Hoopes, Leonard & Glenn
their attorneys May 14, 1957 C. W. HEPPENSTALL ET AL 2,791,921

LATHE SYSTEM OR THE LIKE

Filed Sept. 29, 1951 8 Sheets-Sheet 2

INVENTORS

CHARLES W. HEPPENSTALL

HARRY J. ROSS AND

FREDERICK F. ROHRER, JR.

by Hooper, Leonard & Glenn their attorneys

May 14, 1957 C. W. HEPPENSTALL ET AL 2,791,921

LATHE SYSTEM OR THE LIKE

Filed Sept. 29, 1951 8 Sheets-Sheet 3

INVENTORS
CHARLES W. HEPPENSTALL
HARRY J. ROSS AND
FREDERICK F. ROHRER, JR.
by Hooper, Leonard & Glenn
their attorneys

LATHE SYSTEM OR THE LIKE

Filed Sept. 29, 1951 8 Sheets-Sheet 4

INVENTORS
CHARLES W. HEPPENSTALL
HARRY J. ROSS AND
FREDERICK F. ROHRER, JR.
by Hooper, Leonard & Glenn
Their attorneys.

INVENTORS
CHARLES W. HEPPENSTALL
HARRY J. ROSS AND
FREDERICK F. ROHRER, JR.
by Hopper, Leonard & Glenn
their attorneys.

May 14, 1957 C. W. HEPPENSTALL ET AL 2,791,921

LATHE SYSTEM OR THE LIKE

Filed Sept. 29, 1951 8 Sheets-Sheet 6

INVENTORS
CHARLES W. HEPPENSTALL
HARRY J. ROSS AND
FREDERICK F. ROHRER, JR.
by Hoopes, Leonard & Glenn
their attorneys INVENTORS
CHARLES W. HEPPENSTALL
HARRY J. ROSS AND
FREDERICK F. ROHRER, JR.
by Hoopes, Leonard & Glenn
their attorneys.

May 14, 1957 C. W. HEPPENSTALL ET AL 2,791,921

LATHE SYSTEM OR THE LIKE

Filed Sept. 29, 1951 8 Sheets-Sheet 8

INVENTORS
CHARLES W. HEPPENSTALL
HARRY J. ROSS AND
FREDERICK F. ROHRER, JR.
by Hoopes, Leonard & Glenn
their attorneys.

United States Patent Office 2,791,921

Patented May 14, 1957

2,791,921

LATHE SYSTEM OR THE LIKE

Charles W. Heppenstall, Fox Chapel, and Harry J. Ross and Frederick F. Rohrer, Jr., Pittsburgh, Pa., assignors to Heppenstall Company, Pittsburgh, Pa., a corporation of Pennsylvania Application September 29, 1951, Serial No. 248,928

11 Claims. (Cl. 77—3)

This invention relates to a trepanning lathe system or the like by means of which work is rotated relative to a tubular tool in general alignment therewith to core the work. More particularly, this invention relates to improvements in apparatus and method for performing such trepanning to produce accurately and rapidly drilled forgings and castings of steel or other metal.

Within recent years, lathes were constructed abroad for the purpose of boring forgings and other metal workpieces by the axial removal therefrom of a hollow right cylinder of metal which may be termed trepanning. Since the metal removed in such an operation equals the area of the kerf of the tool times the length of the bore, greatly increased production was obtained. At the same time, the core of the metal surrounded by the kerf was not contaminated in any way and furnished a valuable source of prime scrap metal for remelt purposes in those cases where the core could not be used as the raw metal for some further fabricating operation. The workpiece, itself, on the other hand, with the opening drilled therethrough provided a partially fabricated article usable in many ways such as for gun barrels for relatively heavy ordnance, landing gear assemblies for large aircraft, propeller and rotor shafts, oil field drilling equipment and many other purposes.

Those prior practices however involved a number of difficulties and deficiencies. Thus, in one type of trepanning lathe the feed mechanism was laterally offset making it difficult to obtain proper feeding of the tool relative to the work for close finish tolerances and avoidance of eccentricity. In many kinds of equipment and articles, the bore must be precisely centered relative to the exterior of the drilled article. Another difficulty of the prior practice comprised the need for separately and independently preparing the work by drilling a starting opening therein to support the tool at the initiation of a cutting operation by that tool. Further, after trepanning commenced, troubles might arise by virtue of the relatively constant speed of rotation of the work or difficulty with initial cutting entry of the tool or the further operation of the lathe because of the gear stock employed. If any such trouble did develop, it frequently could continue too long before there was evidence thereof since there was no coordinated control to permit the trepanning operation to be regulated in accordance with the particular corrective action the developing conditions might require on the other hand, complete interruption or cessation of the operation might result in faults or defect in the work and was to be avoided if possible. Another feature in prior devices which caused difficulty was the seal mechanism for the coolant liquid. Leaks were common occurrences and it was troublesome to keep the seal tight as well as to conduct the liquid around the tool in the course of a cutting operation. Such troubles were also at times a limitation upon the coolant liquid pressure and in turn reduced the productivity of the operation.

In the trepanning lathe system improvements of this invention, the foregoing troubles have been overcome.

Thus, a relative axial movement of the work and tools proceeds under the influence of a centrally located feed element which at the same time does not require relatively longer lathe beds to be used. A new sealing assembly remains tight throughout an extremely wide range of fluid pressures which can be applied. Those pressures, moreover, can be varied in the course of the cutting operation. In addition, in the new sealing mechanism, novel provision is made for causing it to creep with the relative axial movement of the work tool to maintain a tight connection between the seal mechanism, the work and the tool for the supply of fluid forced through the interior thereof. Both the rate of relative rotation of the work and of the axial advance during cutting between the tool and the work can be manipulated and varied electrically in minute increments and such variation can take place during operation in accordance with the need at the time being. In the new system further provision is made whereby the tool itself may start the opening to be drilled in the work. Operation under the new system is so coordinated that through the instrumentality of a single operator any rate of speed of any principal element or of any combination of those elements can be varied to most effectively perform a particular cutting operation. For example, an increase in the flow of fluid may be made in the course of a cutting operation in accordance with the continuous temperature indication made available as a part of the new system. Similarly, the rate of feed can be varied to take care of changes that may be wanted in the chip characteristic. The relative rates of movement of the work and tool under the new system are also so arranged and varied to maintain proper cutting relation and reduce any development chance of eccentricity, seizing or hot spots. Particular provision is also made to hold the work in true alignment to keep the centers of the work and of the tool in coaxial relation as well as to provide more extensive accommodation for different diameters of work.

Other objects and advantages of this invention will be apparent from the following description and from the drawings, which are illustrative only, in which.

Figure 6:
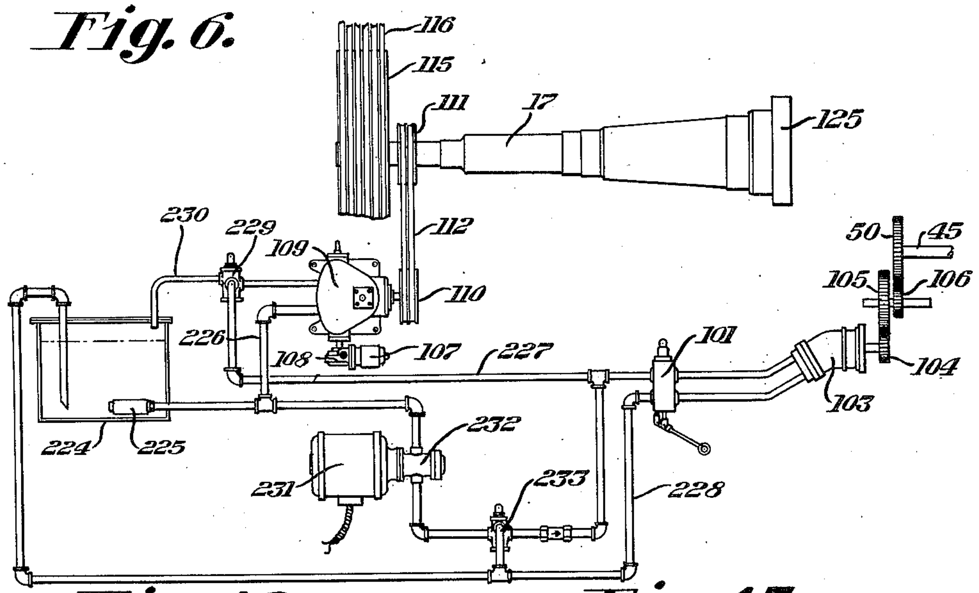
Figure 6 is a schematic view of a work spindle suitable for use in the headstock and of a hydraulic system which may be used to move the tailstock in the assembly of Figure 2.
Figure 18:
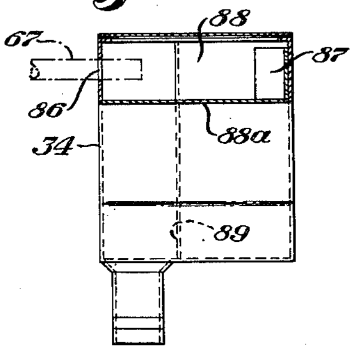
Figure 18 is a sectional view of the housing shown in Figure 17 taken along line XVIII—XVIII thereof.

Referring to the drawings, a trepanning lathe system or the like embodying the improvements of this invention may comprise a trepanning lathe assembly 10 having a massive lathe bed 11, a headstock 12, a tailstock 13 and a control panel 14 mounted on the tailstock. Cooperating equipment may include a motor-generator set 15 with a suitable starter and exciter, a main drive motor 16 employing direct current electricity generated by assembly 15, the said motor 16 having a suitable rheostat and rheostat control motor therewith for directly raising or lowering the speed of a work spindle 17 rotatably mounted in headstock 12. The combination of assemblies 15 and 16 drive work spindle 17 directly without the interposition of any gears and enable the speed of rotation of spindle 17 to be varied at will in the course of a cutting operation to provide whatever speed is best suited for the particular portion of the particular operation being conducted.

A variable speed combination electric and hydraulic motor and pump assembly 18 may be provided and used to control the advance or return movement of tailstock 13. Assembly 18 may be driven directly from work spindle 17 or independently, the controls being located on panel 14.

In addition, a reversible electric motor 19 may be mounted on lathe bed 11 to provide rapid movement, relatively speaking, of tailstock 13 either toward or away from work which may be mounted in trepanning lathe 10.

A movable platform 20 may be provided mounted on flanged wheels 21 which run on tracks 22 behind and parallel to lathe bed 11, on the rear side thereof. On platform 20 there may be provided a fluid pump and electric motor assembly 23, together with a self-priming fluid pump and motor assembly 24 used at the start to bring assembly 23 into operation, for the liquid circulating system. Assembly 23 is preferably constructed to permit a change in the pressure of the liquid supply in the course of a cutting operation by means of the controls on panel 14.

Figures 2, 3:
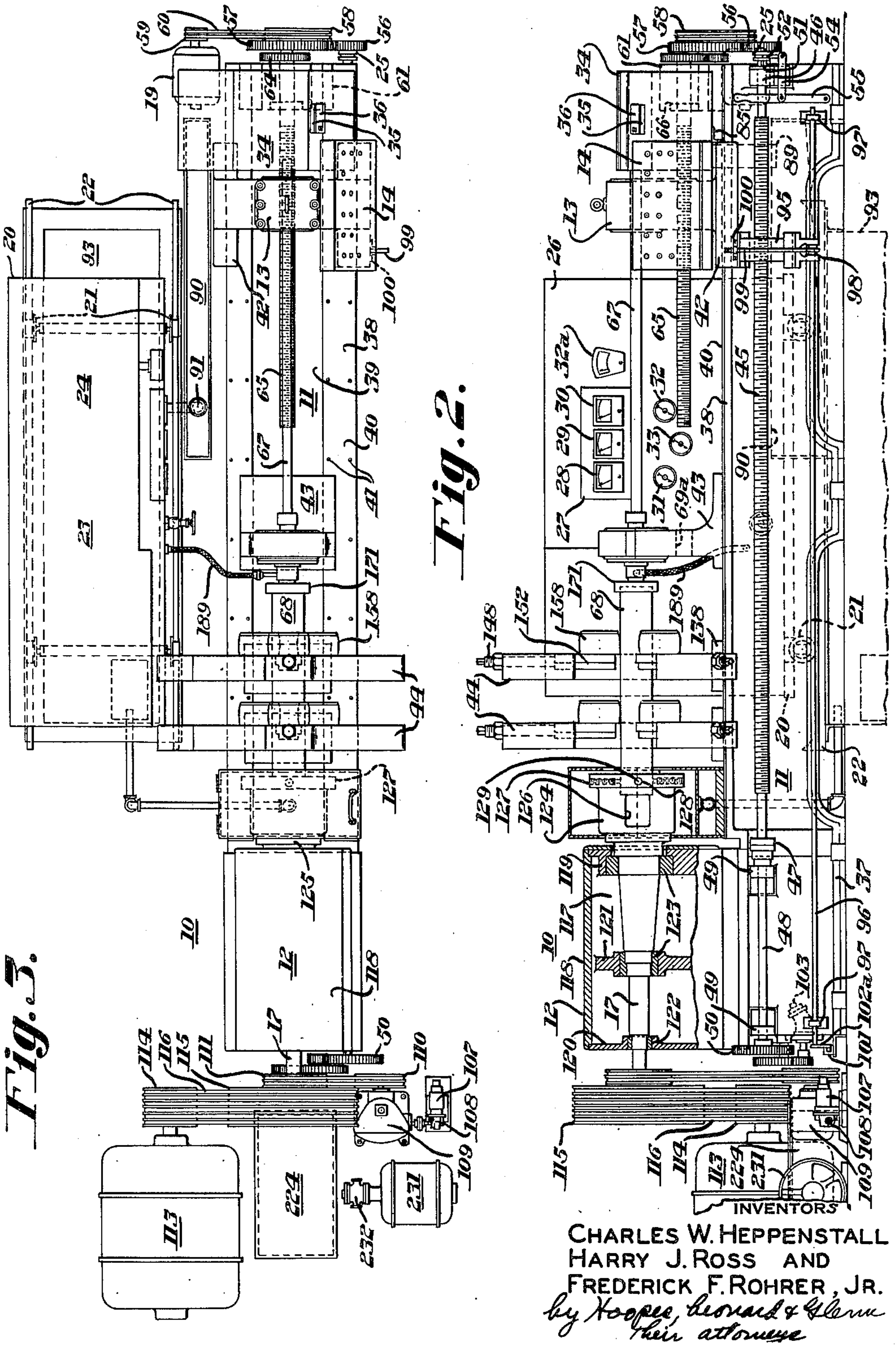
Figure 2 is a front view of a trepanning lathe assembly embodying control arrangement and other features of the new system of this invention.
Figure 3 is a plan view of the assembly shown in Figure 2.
Figure 5:
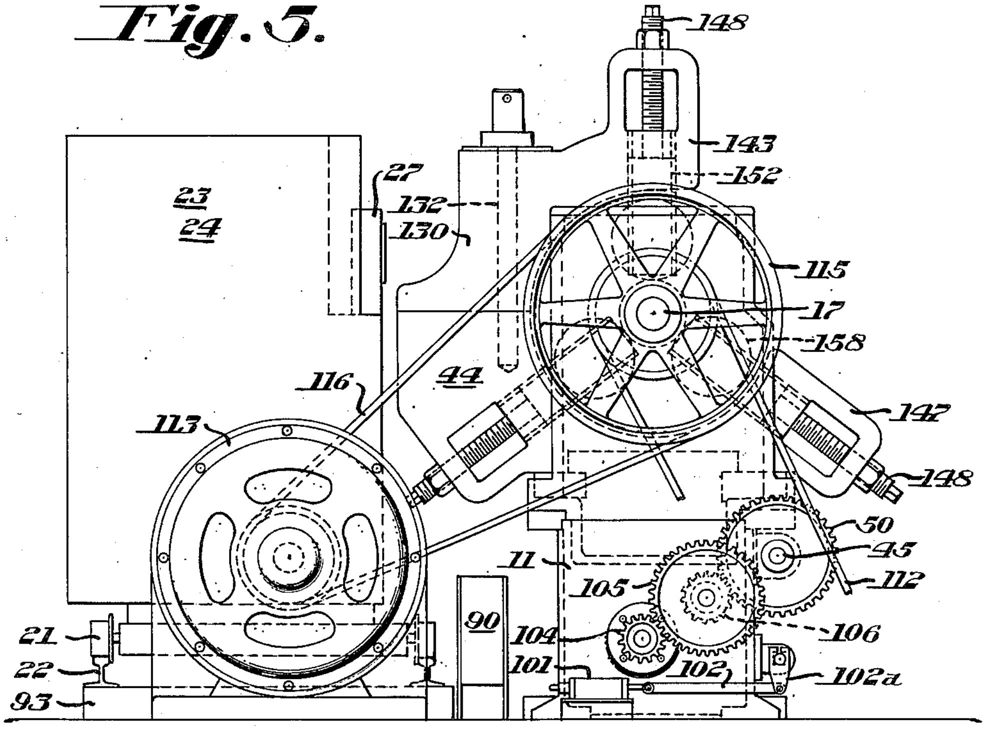
Figure 5 is an end view of the assembly shown in Fig- 2 when viewed from the left hand end thereof.

By means of suitable electrical connections and networks, the first column of buttons on the left, as viewed in Figure 2, on panel 14 may be used to start, stop and jog the work spindle 17 through the medium of assembly 16. The second column of buttons on the left on panel 14 may respectively be used to raise the speed and to lower the speed of the main drive motor in assembly 16 thereby correspondingly changing the speed of spindle 17 right during the course of a cutting operation. The two buttons in the third column of buttons from the left in panel 14 may be used respectively to operate motor 19 to move tailstock 13 toward or away from headstock 12 relatively rapidly in respect to the movement thereof that normally would be obtained by assembly 18. The right center column of buttons, for example, on panel 14 may be used respectively to raise the speed and to lower the speed of movement of tailstock 13 and thereby a tool held therein by the electrical connections between the right center column of buttons, the assembly 18 and the tailstock 13 and its associated mechanism. The single button in the fifth column from the left on panel 14 may be used to jog tailstock 13 by means of an independent motor in assembly 18. A clutch 25 may be provided to alternately connect tailstock 13 with assembly 18 or motor 19 as may be elected. A lever 99 and its associated parts may be used to control the direction of movement of tailstock 13 whenever assembly 18 is connected thereto. The three buttons in the extreme right hand column of panel 14 may be used to raise the speed, lower the top speed and stop the pump in assembly 23. For example, the pump in assembly 23 would normally be stopped when the cutting operation is just completed to prevent the fluid pumped thereby under the desired pressure from shooting out of the end of the work which had just been trepanned.

A second panel 26 may be supported on platform 20 so as to carry a group of gauges 27 by means of which a single operator can control an entire trepanning operation or the like from his station in front of lathe 10 adjacent panel 14 and at the same time make such variations required in the course of the operation to prevent stoppage of the operation or the development of potentially dangerous conditions. Thus, gauge 28 may be used to indicate revolutions per minute of work spindle 17 or the scale therein may be changed to directly indicate the surface or linear speed per minute in a relative sense between the work and the cutting bit of the tool used in the new system. In some cases a separate gauge will be used to show both R. P. M. and surface speed per minute. A gauge 29 may be used to give the feed rate in inches per minute of the axial advance of tailstock 13 carrying the tool toward headstock 12. A third gauge 30 may be used to indicate the percentage of the full permissible load being imposed on the motor in assembly 16 to drive spindle 17 in the course of a cutting operation. Indicating gauge 31 may be provided to show directly the outlet pressure of the coolant liquid being pumped by the pump in assembly 23 which is substantially the pressure at the place of contact between the cutting bit of the tool used in the new system and the work. Indicating gauge 32 may be used to show directly the rate of flow of the coolant liquid, as in terms of gallons per minute, so pumped. Thereby, the operator at all times has knowledge of the remaining capacity of such pump and of the existence of the pressure conditions in the cutting zone to guide him in conducting the operation. Further, an indicating gauge 33 may be used to show directly the pressure of the hydraulic liquid in the circuit of Figure 6 on the high pressure side thereof to call attention to any difficulty which may tend to arise in the movement of tailstock 13. In addition, a temperature indicator **32*a* may be used to show the temperature in the sump from which it is pumped by the pump in assembly 23, such temperature being an indication, for example, of a dull or chipped tool bit or other condition causing an increase in friction or heat in the cutting area. Suitable piping is provided for the pressure gauges and a suitable thermocouple is connected to indicator 32*a***.

It will be evident that an operator positioned at the front of lathe 10 will have all of the information needed to show to what extent any of the respective control buttons on panel 14 may have to be utilized. This utilization may occur in the course of a cutting operation of a normal character as well as occur in situations in which an emergency of some kind may arise. For example, tungsten carbide is a frequently used material in preparing the tool bits which do the actual cutting and the quality of that tungsten carbide from many sources may not be uniformly predictable nor wholly uniform in operation throughout the single life of a particular tool bit. As a consequence, any change in the characteristic of a single bit or of successively used bits can be compensated for by an operator utilizing the new system of this invention. In addittion, a tailstock housing 34 may be provided connected to tailstock 13. An inspection opening or port 35 having a hinged cover 36 thereover is so located that the same operator handling panel 14 and the operator of lathe 10 under the new system can immediately and continuously supervise the characteristics of the chips removed from the work in the course of a cutting operation so that operation may be varied immediately and directly if some change is required to provide and maintain uniform the desired chip characteristic. As an illustration, if the chips are too long, the R. P. M. of the work and for the feed rate of the advancing tailstock 13 towards headstock 12 may have to be increased to provide a desired shorter type of chip for satisfactory performance. Moreover, for longer lengths of work an increase in the pressure of the liquid circulated through the tool will generally be required of the pump in assembly 23 to properly flush the chips back through the hollow center of the tool into the tailstock housing 34.

Lathe bed 11 which may be made of cast iron is provided with legs 37 suitably fastened to a proper foundation in the plant and has ways 38 on each side of an open center 39 therein. Hardened steel wear strips 40 are removably fastened to the top of the ways 38 by means of countersunk head machine screws 41 so as not to project above the upper surface of the respective strips 40. Strips 40 supportably engage in sliding relation the relatively movable portions of the new system such as runners 42 of tailstock 13. The provision of hardened wear strips 40 prevents "washboarding" of the ways 38 and helps to maintain the accuracy and precision of the trepanning operation accomplished by this new system. Strips 40 and lathe bed 11 also supportably engage a tool saddle assembly 43 and steadyrests 44. These various members are clamped to the ways and are usually moved into position by being slid therealong whenever repositioning is required in setting up a new job because of a change in the nature of the length or size of the work to be cored. A toothed bar 11a may be used to hold the end of a crowbar in sliding saddle 43 and steadyrests 44 into any new position.

A transmission shaft 45 which is threaded over most of its length with a force applying thread such as a modified square thread is journaled at its right hand end in a bracket 46 bolted to the front of bed 11. The thread on shaft 45 may be used in a conventional manner, if desired, and, if not, the threading may be omitted. The left hand end of shaft 45 is supported by a coupling 47. A connecting shaft 48 is journaled in brackets 49 bolted to bed 11 and is keyed to coupling 47 at its right hand end to transmit movement to shaft 45. The left hand end of shaft 48 is keyed to a spur gear 50.

The right-hand end of shaft 45 extends beyond bracket 46 and is provided with a spline 51 on which the clutch 25 slides. Clutch 25 is circumferentially grooved so that it may rotate with respect to a ring 52 positioned in that groove. Ring 52 in turn is pivotally connected to a link 54 and thence to hand lever 55, the lower end of which is pivotally fastened to bed 11. The hub of a spur gear 56 is fixed to the clutch 25 so that upon moving hand lever 55 to the left the entire gear 56 is moved out of meshing engagement with a large spur gear 57. Gear 57 is provided with a pulley hub 58 which coacts at predetermined times with a pulley 59 on the shaft of motor 19, the respective pulleys being connected by an endless band 60 in the form of V-belts.

A pillow block 61 has therein suitable roller thrust bearings for the shaft 62 to which gear 57 is keyed. A further pinion gear 63 is keyed to shaft 62 and meshes with a spur gear 64. Spur gear 64 is keyed to a threaded shaft 65 the axis of which lies in a vertical plane which also contains the center of the lathe 10 which may generally be defined as coinciding with the axis of work spindle 17. Roller thrust bearings 66 are fastened in bearing 61 which in turn is bolted to lathe bed 11 in such a manner that shaft 65 is substantially a cantilever. The portion of shaft 65 engaging the bearings 66 is not threaded. The threads on shaft 65 are preferably of a force applying type such as a modified square thread. Lying as it does in the vertical center plane of lathe mechanism 10, the shaft 65 is enabled in a trepanning operation to apply substantially direct central force to tailstock 13 to move a tool 67 clamped therein into engagement with a piece of work 68 rotated by spindle 17. While normally the axis of shaft 65 will be placed as close as possible to the axis of shaft 67 to prevent or to minimize off-setting forces as much as possible, sufficient distance must be left between the respective axes to accommodate the largest diameter of work that may be cored in the operation of lathe 10. Further, by making shaft 65 a cantilever, the provision of an opening 69a in saddle 43 in alignment with shaft 65 permits the entire lathe assembly to be foreshortened from end to end for some work thereby saving material expense without reducing the length of the work that can be handled therein. Conversely, when the work is relatively short as is the work 68 in the illustration, the distance tailstock 13 moves towards work 68 in the course of a cutting operation by tool 67 can be greater for a given length of lathe which again is an advantage.

In a cutting operation, the rotation of spur gear 50 will rotate transmission shaft 45 and with lever 55 over to the right, will place gears 56 and 57 in engagement to rotate shaft 65 and thereby feed tool 67 in tailstock 13 toward and into work 68. When the cutting operation has been completed, lever 55 can be swung to the left and motor 19 energized by the appropriate button on panel 14 to withdraw the tool by moving tailstock 13 to the right relatively rapidly compared to the cutting feed rate occasioned by the rotation of shaft 45. Similarly, on some occasions it may be desirable to relatively rapidly advance tailstock 13 and tool 67 toward a piece of work to be fabricated and again in those cases clutch 25 will be disengaged permitting motor 19 to be employed to move tailstock 13 into position, the other button on panel 14 being used for that purpose, since motor 19 is a reversible one. Generally, motor 19 will not have sufficient capacity for a cutting operation, all such cutting being performed through the force applied through rotating transmission shaft 45 when clutch 25 is in engaged position relative to gear 57.

Tailstock 13 comprises a base 69 integral with the elongated bearing runners 42 and a cap 70. The cap 70 is provided with an eye-bolt connection 71 to permit a crane, for example, to remove the cap when and as the tool 67 is to be changed. Upper and lower clamping blocks 72 and 73 respectively fit within a drilled opening 74 defined by the inner surfaces of base 69 and cap 70 respectively when the two are bolted together by stud bolts 75. An axial opening 76 through the clamping blocks 72 and 73 precisely fits the exterior of a tool such as tool 67. When the tool is to be changed for one of differing exterior diameter, another set of clamping blocks is provided having an opening corresponding to the outside diameter of the new tool. With the clamping blocks in place and cap 70 bolted to base 69, any tool such as tool 67 is rigidly held in alignment with the center of the lathe and of a workpiece such as work 68.

The axial length of the clamping blocks such as blocks 72 and 73 and the strength of the tool such as tool 67 are such as to prevent deflection which would impair the quality of the cutting operation.

The central portion of base 69 is provided with openings 77 and 78 therethrough. A follower nut 79 is internally threaded to engage shaft 65 over a sufficient length to move tailstock 13 in accordance with the direction of movement of shaft 65. In addition, nut 79 furnishes support to shaft 65 in addition to the support furnished thereby by the bearings 66 thus facilitating the construction whereby shaft 65 can be provided as a threaded cantilever shaft. The nut 79 is provided with a flange which in turn is bolted to base 69 to fasten the two together.

Figure 7:
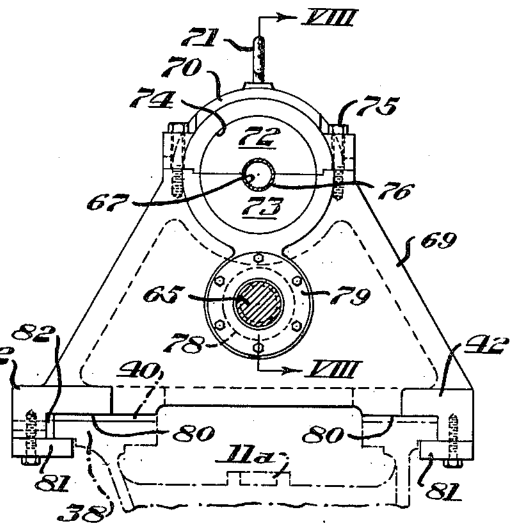
Figure 7 is a view from the right hand end as viewed in Figure 2 of the tailstock thereon without the electric control panel being shown.
Figures 11, 12:
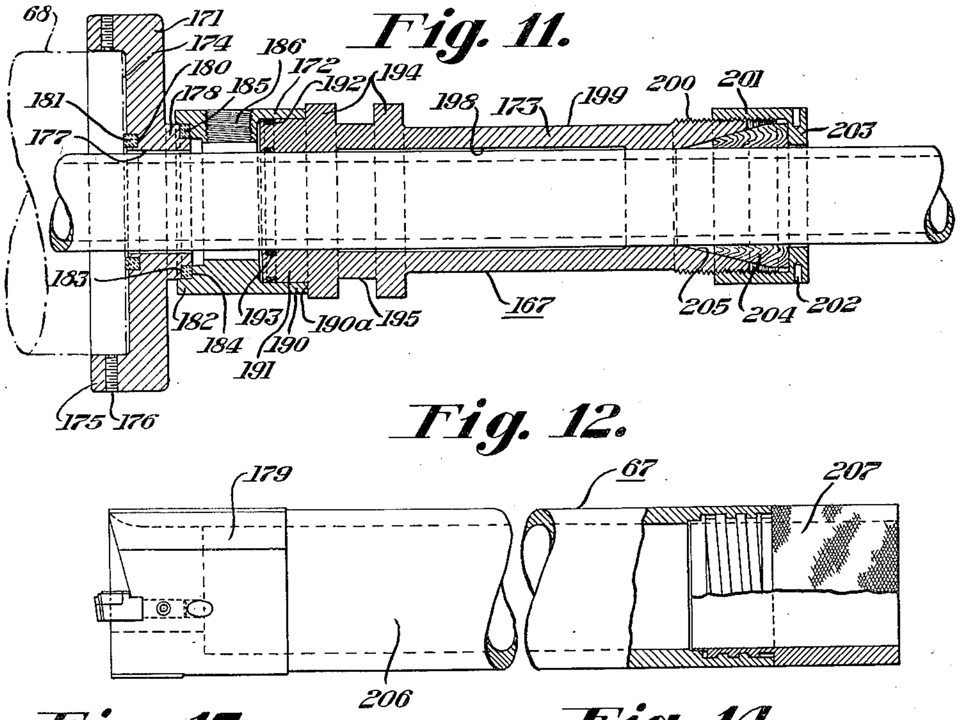
Figure 11 is an enlarged view in section taken along line XI—XI of Figure 10 of the sealing assembly in operative relation with a tool shaft.
Figure 12 is a view partly in section of a tool suitable for use in the new system of this invention including a shaft, cutting head and bit.
Figures 13, 14, 15:
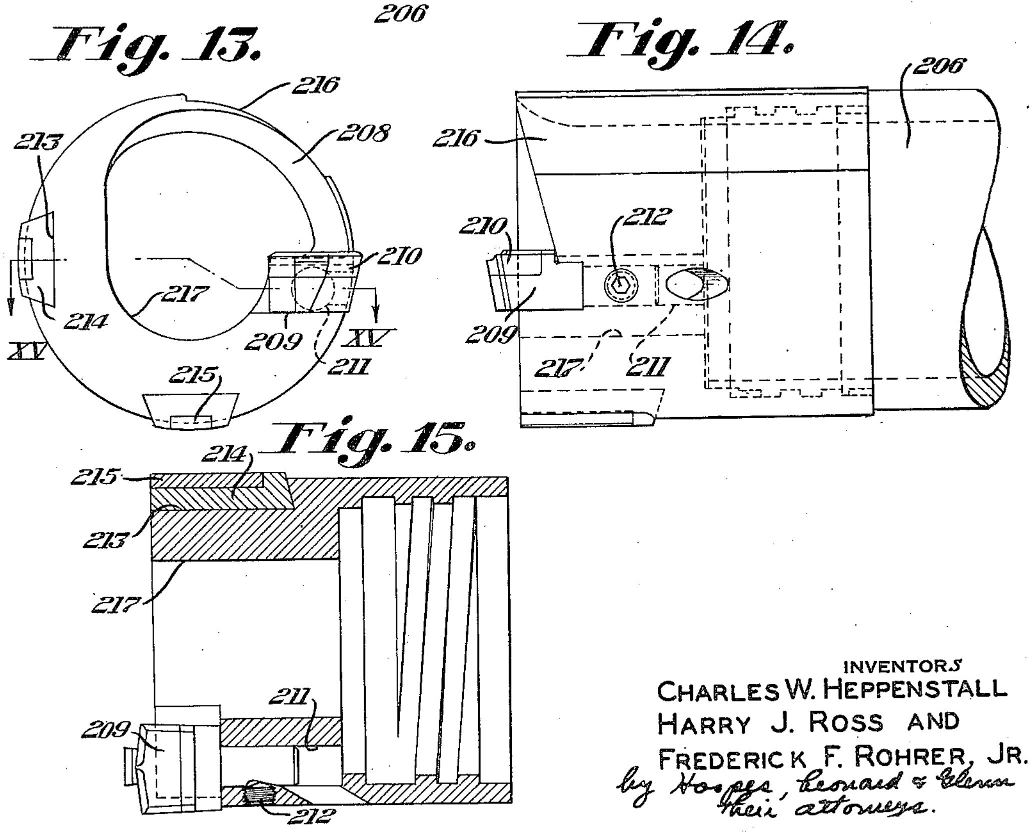
Figure 13 is an enlarged view of the cutting head shown in Figure 12 looking at the front thereof.
Figure 14 is the side view of the cutting head shown in Figure 13 showing the cutting bit positioned therein.
Figure 15 is a sectional view of the head shown in Figures 13 and 14 taken along line XV—XV of Figure 13.

Bearing surfaces 80 on the underside of the respective runners 42 are supported on and by the wear plates 40 which the surfaces 80 slidably engage. Retainer plates 81 are bolted to the underside of the respective aprons of the runners 42 as shown in Figure 7 and extend inwardly toward each other a sufficient distance to slidably engage the finished underside of the outer edge of the ways 38. A shim bar 82 is provided and positioned between the rear side of the apron of the front runner 42 and the front way 38 to hold tailstock 13 in alignment with the ways and spindle 17 and at the same time take up any undue clearance. A similar shim may be used on the rear side of the lathe if in setting up some slight adjustment is required to make the axis of tailstock 13 coincide with the center of work spindle 17. Set screws 83 extending through runner 42 keep filler block 82 in place.

Figure 17:
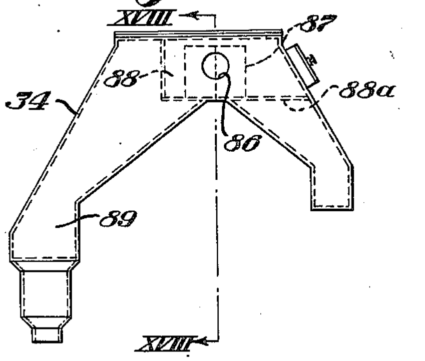
Figure 17 is a side view looking at the tailstock housing shown in Figure 2 from the left hand side thereof.
Figure 1:
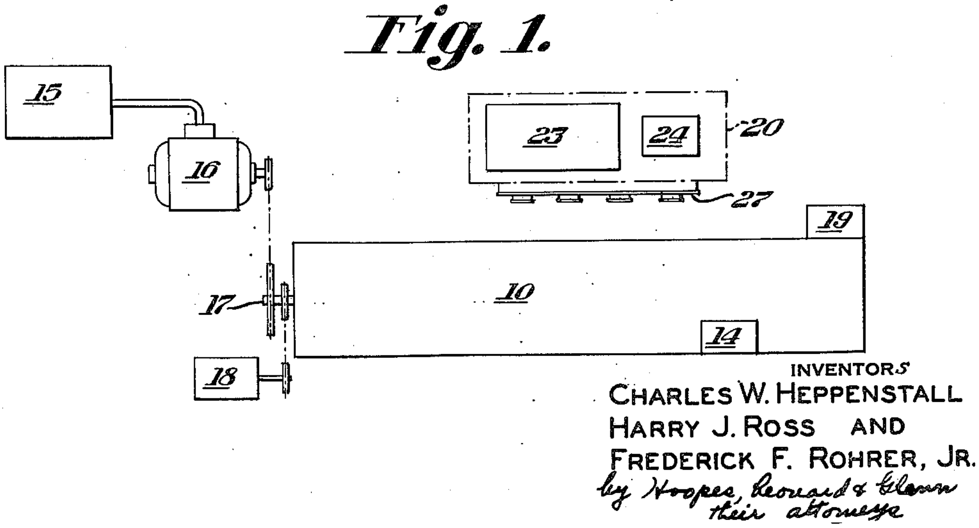
Figure 1 is a plan position lay-out of an arrangement which might be utilized in practicing the new system of this invention.
Figure 4:
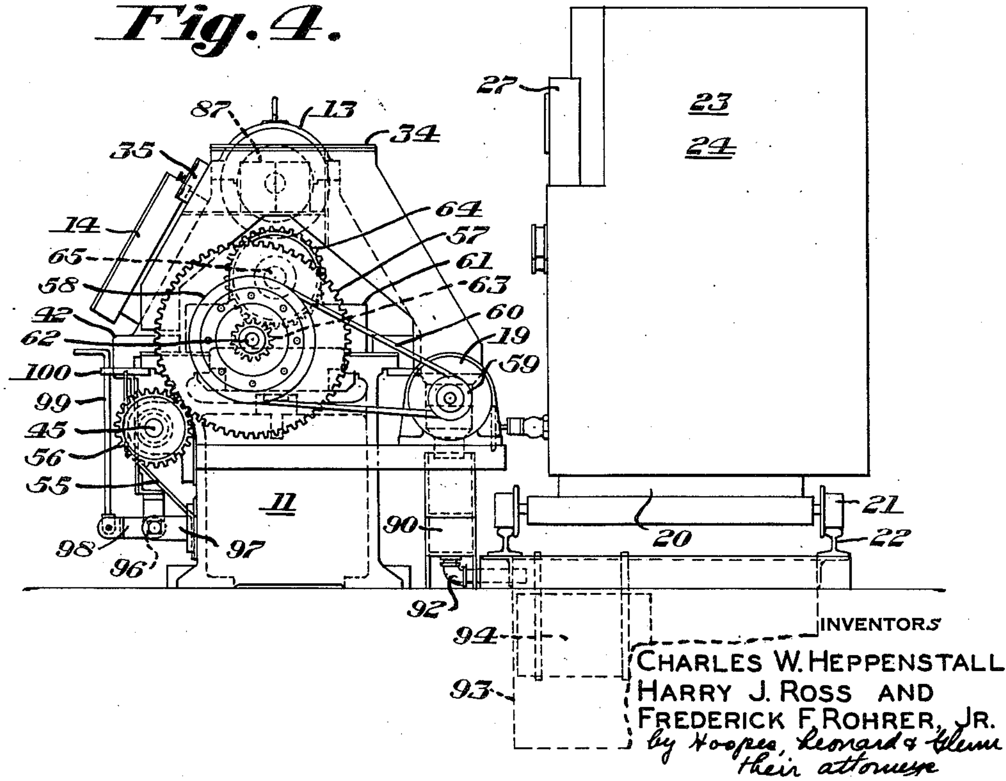
Figure 4 is an end view looking at the assembly shown in Figure 2 from the right hand end thereof.
Figure 10:
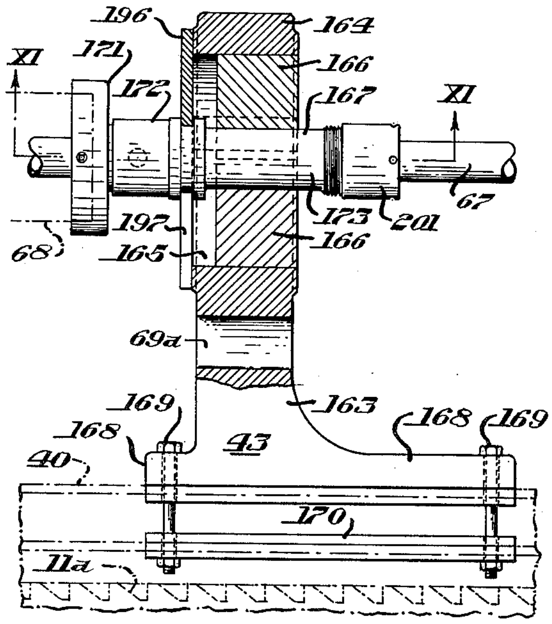
Figure 10 is a view in section taken along line X—X of the saddle shown in Figure 9 with a new sealing assembly arranged therewith.
Figures 16, 19A:
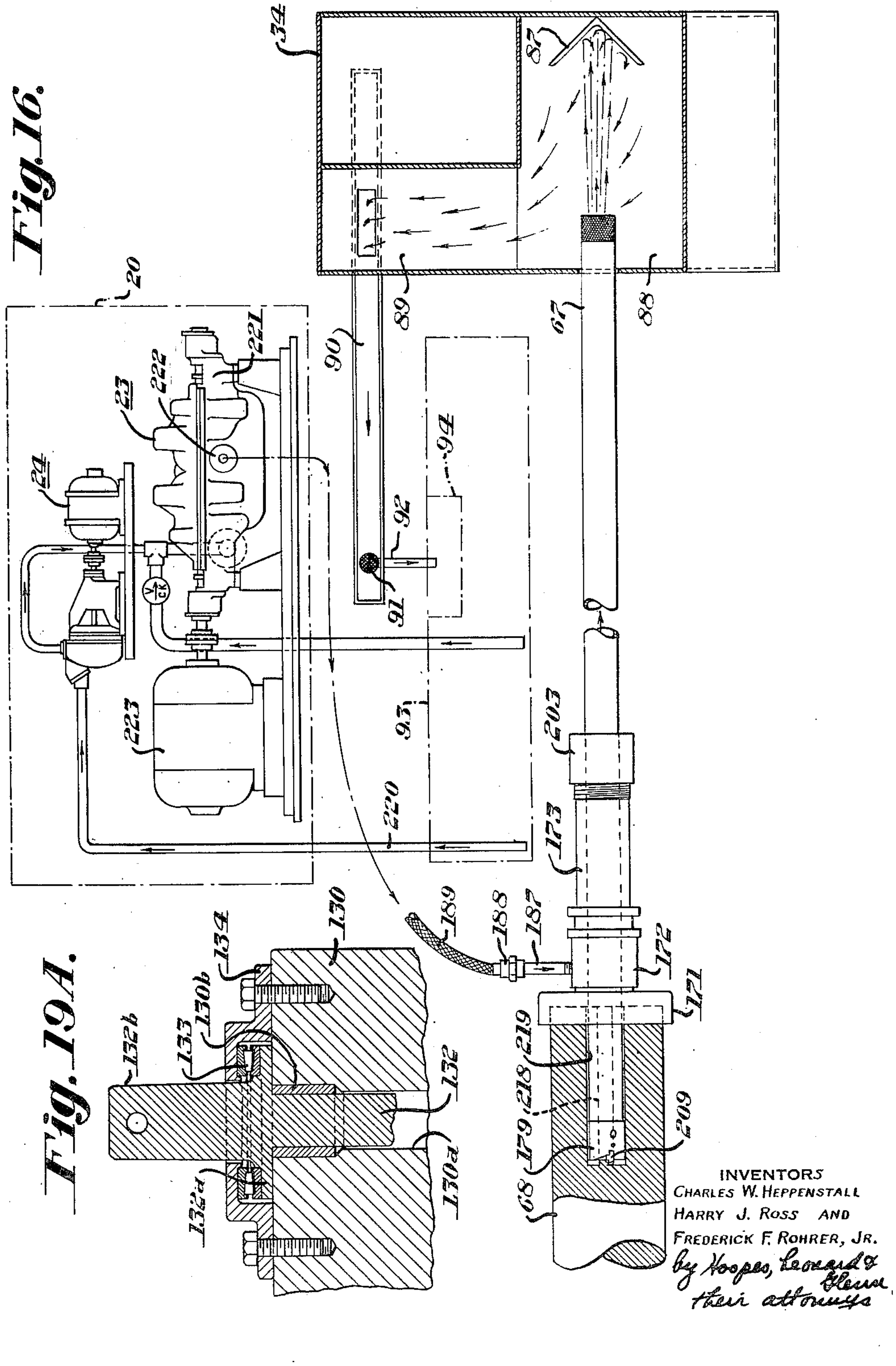
Figure 16 is a view of a tool and sealing assembly engaged in a cutting operation on some work and showing a circulating liquid arrangement suitable for use in the new system of this invention.
Figure 19A is a view in section taken along line XIXA—XIXA of Figure 19.

Panel 14 is affixed to the front side of base 69 and tailstock housing 34 is affixed to the rear side thereof by brackets 85. Housing 34 is generally chevron-shaped as shown in Figures 4 and 17. It is thus able when tailstock 13 is all the way to the right to extend over a portion of bearing 61 and at the same time to clear and act as guard aprons over the threaded shaft 65. The side of housing 34 toward tailstock 13 is provided with an opening 86 through which the rear of tool 67 extends so as to discharge the liquid pumped between tool 67 and work 68 and the metal chips removed in the cutting operation into the interior of housing 34 which also acts as a splash guard. Such flow is schematically illustrated in Figure 16.

A diverter plate or angle 87 is fixed in position inside the top of housing 34 within a chamber 88 having a bottom 88a which causes the fluid to flow into leg 89 the bottom of which is open and is positioned above and so as to extend into the open top of a trough 90, which extends along parallel to lathe bed 11, regardless of the position of platform 20 relative to bed 11. Trough 90 has a screened drain 91 at its lowermost point and a pipe 92 to conduct the fluid back into a sump 93 between and beneath the sides, generally, of platform 20. A wire strainer 94 hangs in sump 93 in a position to receive all of the discharge from pipe 92 to provide any further screening that may be necessary so that the liquid in sump 93 outside strainer 94 is kept free from minute metal chips or other foreign matter.

During discharge of chips and fluid through the open rear end of tool 67 into housing 34, the door 36 may be opened periodically to insert a scoop to catch some metal chips so they may be inspected and, if desirable, such samples may be taken out through the opening 35 for metallurgical or other examination. The door 36 is normally kept closed by a spring or latch and the opening 35 is shielded by the diverter plate 87 to a sufficient extent to prevent any material projection of fluid out through opening 35 when the door 36 is so opened. Further, the pressure of the fluid as it enters housing 34 is relatively low as contrasted with the pressure required to force the liquid into the area where the cutting operation is taking place. If such an inspection should indicate, for example, that the chips are too short, the feed rate may be reduced or other action taken to correct the situation by appropriate manipulation of the proper button on panel 14. Further, any other changes which become desirable in the course of a cutting operation as may be indicated on the gauge board 27 can also be made by a single operator handling the entire trepanning operation.

A clevis plate 95 is rigidly fastened at its upper end to front runner 42 and at its lower end loosely fits over a rectangular bar 96. Bar 96 has cylindrical ends which are journaled in brackets 97 fastened to lathe bed 11. The openings in the lower ends of plate 95 permits the rotation of bar 96. An arm of a clevis 98 extends rearwardly and has a rectangular opening fitting over the rectangular section of bar 96 in slidable relation thereto. The bifurcated forward ends of clevis 98 extend between the lower guiding sides of plate 95 and around each side of the lower end of a feed lever 99. Those bifurcated ends of clevis 98 are slotted and a bolt passes through said slots and through a registering drilled opening in the lower end of lever 99. The upper end of lever 99 is held against runner 42 by a bracket 100. The top of lever 99 is bent outwardly to form a handle. By means of recesses in the side of lever 99 or a spring within bracket 100 bearing against lever 99, the lever 99 will be held in whatever vertical position to which it may be moved by the operator. Thus, as tailstock 13 moves along the ways 38, the clevis 95 will cause clevis 98 to slide along the length of bar 96. However, any vertical movement of lever 99 acting through the clevis arm 98 between the sides of the clevis at the lower end of plate 95, will correspondingly rotate the bar 96 to control a hydraulic valve 101 connected to one end of a link 102. The other end of link 102 is pivoted to crank 102a keyed to the left-hand end of bar 96. Normally there are three vertical positions of lever 99, the extreme up position being forward, the extreme down position being reverse and the position in between being neutral. Horizontal positions of the movable portions in hydraulic valve 101 correspnding to the "up" and "down" positions of lever 99 control the direction of rotation of a hydraulic motor 103 which is a prime mover the shaft of which is keyed to a pinion 104 and supported in a suitable bearing fastened to lathe bed 11 as illustrated in Figure 2. In the neutral vertical position of lever 99 there is no movement of prime mover 103.

Pinion 104 meshes with a spur gear 105 the shaft of which is again suitably journaled in a bearing attached to bed 11. The shaft of gear 105 carries a further pinion 106 thereon and keyed thereto, which is in meshed engagement with spur gear 50. When valve 101 is in the feed or forward advance position, the rotation of the respective parts causes tailstock 13 to move toward headstock 12. Conversely, when valve 101 is put in reverse or return position the parts rotate in the reverse direction and cause tailstock 13 to move away from headstock 12 by reversing the direction of rotation of shaft 65. In neutral, there is neither movement of tailstock 13 nor of transmission shaft 45 nor of threaded shaft 65.

The rate of feed and of reverse of shaft 65 is controlled by the proper buttons on panel 14 which through an electrical network are connected to an electric motor 107 and speed reducer 108 to vary the pump piston displacement inside a hydraulic liquid pump 109, all of which are in the hydraulic assembly 18 mentioned earlier. A pulley 110 keyed to the shaft of pump 109 is connected to a pulley 111 by an endless band 112 comprising V-belts. Pulley 111 is keyed to the shaft of spindle 17. Hence, as spindle 17 is turned by a variable speed direct current electric motor 113 in assembly 16, pump 109 will be simultaneously operated except that it will idle when lever 99 and valve 101 are in neutral position.

A pulley 114 is keyed to the end of the armature shaft of motor 113 while another pulley 115 is keyed to the end of spindle 17. An endless band 116 connects the respective pulleys and comprises a series of V-belts. The second column of buttons from the left on the panel 14 directly controls the speed of motor 113 through a rheostat and hence directly controls in minute increments the speed of work spindle 17 without any backlash or other difficulties inherent in a gear drive.

Headstock 12 comprises a box-like structure 117 having a cover 118 bolted thereto. The respective end walls 119 and 120 as well as a central partition 121 inside structure 117 are correspondingly provided with openings 122 in alignment with each other. The work spindle 17 is stepped and provided with bearing surfaces in those portions thereof opposite to the sides of the openings 122. Roller and roller thrust bearings 123 are respectively positioned between the bearing portions of spindle 17 and the sides of the respective openings 122 so that spindle 17 is free to rotate in headstock 12 but cannot move axially relative thereto. Suitable forced lubrication may be provided to all of the bearings in the headstock and to all other pressure points and bearings in any conventional manner.

A lantern chuck 124 is bolted to face plate 125 on the inner end of spindle 17. Windows 126 may be provided on opposite sides of chuck 124 extending from the inside to the outside thereof to permit an operator to see within the chuck in the course of setting up work therein and upon the completion of a trepanning operation to uncouple the cutting head of the tool to insure against any scoring of the trepanned portion of the work as the tool is withdrawn. A flange 127 of chuck 124 is radially drilled at points 128 around the periphery thereof, the outer portions of the drilled openings 128 being threaded for the reception of set screws 129. Generally, set screws 129 bear on radial jaw pieces having their innermost faces serrated to grip a workpiece such as the work 68 when the said screws are tightened forcing the jaws into radial engagement with the end of the work to be held by the chuck.

The part of the work extending toward the tailstock 13 is usually in the form of a right cylinder or at least will have portions thereof finished like a right cylinder against which one or more steadyrests 44 may bear. Each steadyrest 44 comprises a top 130 and a bottom 131. A pivot pin 132 is threaded at its lowermost end to engage a correspondingly threaded socket 131*a* in bottom 131, pin 132 extending through opening 130*a* in top 130. A bushing 130*b* is positioned in opening 130*a* surrounding the unthreaded portion of pin 132. A flange 132*a* on pin 132 is engaged by a roller thrust bearing 133 fixed in relation to top 130 by a retainer 134 bolted thereto. A recess 135 fits over a pin key 136 fastened to bottom 131 when the top and bottom of steadyrest 44 are in operative position. However, as the top 132*b* of pin 132 is rotated in the proper direction, the threads at the lower end thereof will lift top 130 off pin 136 freeing it to a sufficient extent so that top 130 can be swung around on flange 132*a* into a plane at an angle to the plane of bottom portion 131. Such a provision permits work to be readily inserted in and removed from the lathe 10. When a new job is in place, the top 130 can be swung into alignment with bottom 131 as shown in Figure 19 while pivot pin 132 is rotated in the other direction to lower top 130 and cause recess 135 to engage pin 136 to lock the two parts of the steadyrest in operative position.

The bottom portion 131 of steadyrest 44 is provided with bearing surfaces 137 which rest on the wear plates 40 and can be slid along the ways 38 of lathe bed 11 to the precise location in which it is to be used. Integral flanges 138 on each side of base portion 131 are drilled for bolt and nut assemblies 139 which connect the respective flanges 138 with a clamping plate 140 to clamp the respective ways 38 therebetween and hold the steadyrest 44 locked in its selected operative position.

Figures 19, 20, 21:
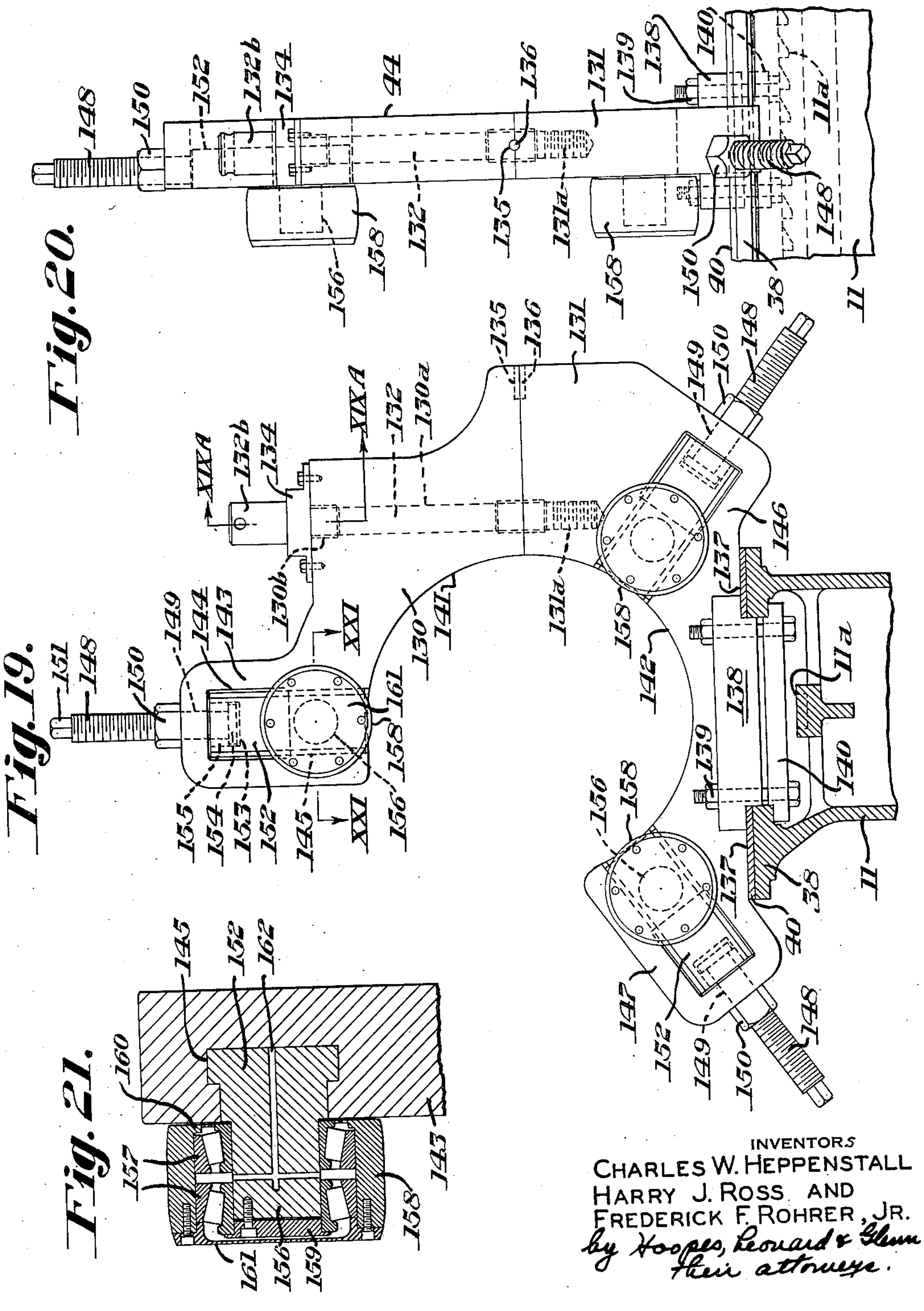
Figure 19 is an enlarged view of a novel steadyrest assembly viewed from the right hand side thereof when in position in the assembly shown in Figure 2.
Figure 20 is an end view looking at the right hand end of the steadyrest shown in Figure 19.
Figure 21 is an enlarged detailed view in section taken along line XXI—XXI of Figure 19.

When top portion 130 is in its operative position as shown in Figures 19 and 20 and pin 132 is tightened so that the two portions are locked together, the respective inner edges 141 and 142 of the top and base portions describe the major portion of a circle equidistant from the lathe center. The gap between the outer ends of the edges 141 and 142 is that through which smaller work may be inserted without pivoting top 130 away from bottom 131. For larger diameters of work, the portion 130 is turned so as to admit the work into the space defined by the edges 141 and 142 when in operative position. Edge 141 has at the top thereof a guide 143 comprising a recess 144 and an undercut guiding slot 145. Similar guides 146 and 147 are provided in base portion 131 in equilateral relation to guide 143 about the lathe center. A threaded adjustment rod 148 extends through the outermost end of each guide the opening 149 therethrough being tapped. A lock nut 150 is associated with each adjustment rod 148 which has a squared end 151 for the purpose of being turned.

A slide 152 is shaped so as to slidably engage the undercut slot 145 in each guide so that it can be reciprocated in such guides both radially and normally relative to the lathe center and the center of the work 68. The outer end of each slide 152 has an axial recess 153 therein for the innermost end of rod 148, such innermost end being provided with a flange 154 held in place relative to slide 152 by a locking ring 155. If desired, roller bearings may be provided between the relatively movable parts.

The inner end of each slide 152 is provided with a stub shaft 156. Shaft 156 engages the inner race of a pair of roller thrust bearings 157 by means of a press fit. The outer race of the bearings 157 engages the inside of a roller 158 held in position by a cap plate 161, the other edge of the roller 158 having a flange 160 to keep foreign matter out of the interior of the roller structure. A retainer plate 159 is also provided and bolted to the end of shaft 156 to hold the inner race in place. Suitable lubricating passages 162 may be provided for lubricant under pressure by means of any normal lubrication connections or by means of suitably placed Alemite fittings.

The positioning of the shafts 156 is such that the periphery of the roller 158 extends beyond the innermost end of the respective slide 152 and the inner side of the roller 158 is offset to one side so as to just clear its respective guide. The length of the slots 145 is such that the entire roller except for the smallest possible bearing arc may be withdrawn beyond the circle described by the edges 141 and 142. In such an extreme position, as illustrated in Figure 19, it is possible to place work the external diameter of which is substantially as great as that circle described by the respective edges 141 and 142. The surface of the rollers 158 is generally convex at the edges with a relatively flat portion connecting those edges across the width of the roller whereby they will support work such as work 68 and roll relative to it in such a manner that as the work is turned by the spindle 17 the axis of the work will remain coincident with the axis of the lathe 10 and of the spindle 17. Hence the work will also remain coaxial with the axis of the tool 67 and no eccentricity will result in the course of a cutting operation. Further, the character of the bearing surface of the rollers 158 is such that it will not tend to cause the work to move or slip axially in the course of a trepanning operation, thereby preventing misalignment or any tendency to pull the work out of or move it into the chuck.

The tool saddle 43 comprises a base piece 163 and a cap 164 adapted to be bolted thereto to define an opening 165 within which are positioned the two semi-circular guide blocks 166 which position a sealing assembly 167 through the center of which the tool 67 passes. An eye bolt may be screwed into the top cap 164 to permit a crane to lift the cap off whenever the lathe 10 is to be taken down or set up for a new job. The flanges 168 of base 163 are supported on the wear plates 40 and are drilled for nut and bolt assemblies 169 so that the flanges 168 can be connected to a clamping plate 170 to clamp the ways 38 therebetween and thereby secure saddle 43 in its selected operative position along the ways 38. Thus, after saddle 43 has been slid along ways 38 into position and there clamped, a tool 67 and seal assembly 167 may be assembled and extend through the openings provided therefor in the guide blocks 166 and saddle 43. Tool 67 will thereby be rigidly held radially with its axis coincident with the axis of the spindle 17 and the workpiece 68 while at the same time axial movement of tool 67 relative to the work 68 is permitted. For different diameters of core, the opening through the center of the blocks such as blocks 166 will be correspondingly varied as will the dimensions of the sealing mechanism corresponding to mechanism 167.

The sealing assembly 167 comprises a work cap 171, a stationary collar 172 and a sleeve 173 as the principal equipment parts therein. Cap 171 fits over the tool entry face 174 of a workpiece such as work 68 and is provided with a flange 175 radially drilled around the periphery thereof for set screws 176 to be set about hand-tight to engage the work and hold cap 171 true relative to the axis of the lathe and work. Usually, the face 174 of workpiece 68 and the steady-rest spots thereon will be machined before the work is placed in lathe 10. A central opening 177 is provided in cap 171 and may have a cylindrical flange 178 to increase the axial length of the opening 177. The sides of opening 177 constitute a pilot member for a head 179 on a tool such as tool 67. An annular groove 180 is provided on the surface of cap 171 in opposed relation to face 174. A packing ring 181 fits in groove 180 and is placed under compression between cap 171 and face 174 to seal the annular space between the exterior of tool 67 and ring seal 181 so that no fluid under pressure in that space can move radially outwardly.

Collar 172 is generally cylindrical and assembled so as to surround the exterior of a tool such as a tool 67 but spaced therefrom. An axially extending flange 182 is just enough larger than the exterior dimension of the base of cylindrical flange 178 to provide a relatively easy telescoping fit therewith. A finished shoulder surface 183 in flange 178 opposes a finished shoulder surface 184 inwardly of flange 182 on collar 172 to provide a recess for a rigid seal ring 185. Preferably, seal ring 185 is unbroken and made of a carbonaceous material such as graphite and a suitable binder. The cross section of ring 185 is such that it fits against the surfaces 183 and 184, which may be ground, in sealing surface relation thereto. Seal 181 may be made like seal 185 if desired. The body of collar 172 is provided with a tapped opening 186 into which a nipple 187 is screwed, the nipple being provided with a union connection 188 so that it can be connected to a flexible pressure hose 189 through which a liquid under pressure is supplied by assembly 23 in the course of a cutting operation.

Figure 9:
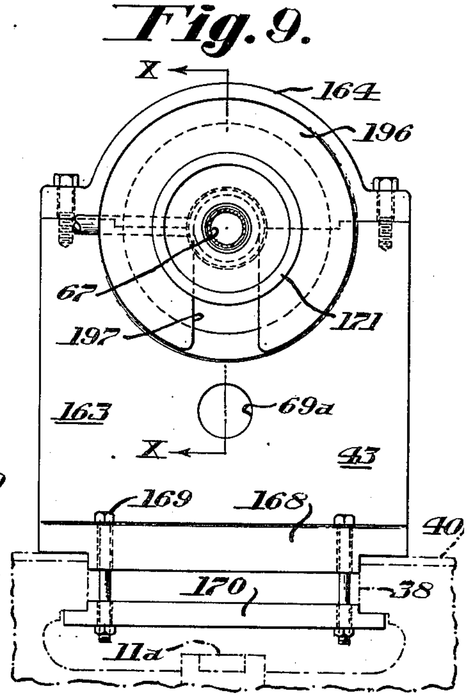
Figure 9 is a side view from the left hand side as viewed in Figure 2 of a tool saddle shown therein.
Figure 8:
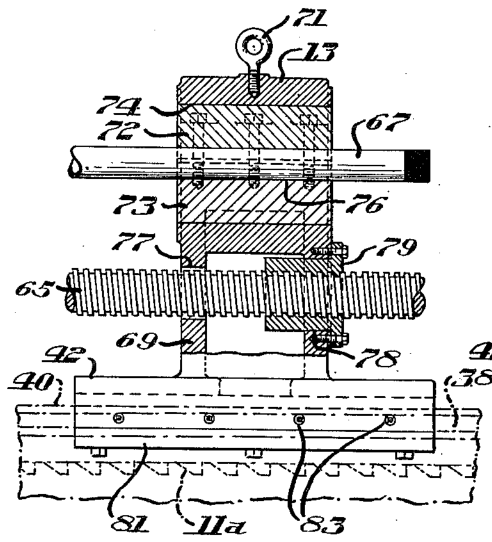
Figure 8 is a sectional view of the tailstock shown in Figure 7 taken along line VIII—VIII of Figure 7.

A further axial extending flange 190 on collar 172 is in telescoping relation with a hub portion 191 on sleeve 173. Circumferential grooves 192 and 193 are provided in hub 191 for O-rings of packing material such as neoprene or other type of ring seal to respectively prevent liquid, entering the interior of collar 172 through opening 186 under pressure, from flowing out between the interior of flange 190 and the exterior of hub 191 or between the exterior of the tool 67 and the inner surface of hub 191. Peripheral flanges 194 are provided in spaced relation on sleeve 173 so that the space or groove 195 between them may be engaged by a retainer plate 196 which has a slot 197 to fit around the bottom of the groove to allow the plate 196 to move into the operative position shown in Figure 9.

The hollow center of sleeve 173 is counterbored at 198 to reduce unwanted friction between the interior 198 of sleeve 173 and the exterior of a tool such as a tool 67. The exterior surface 199 in the central portion of sleeve 173 is finished and is the part which fits the opening through the guide blocks 166 closely enough for continuous alignment but not so tightly as to prevent the sealing assembly from creeping toward the work in the course of a cutting operation to maintain the seals 181 and 185 under compression at all times, sleeve 173 pushing collar 172 and cap 171 towards face 174.

The end of sleeve 173 toward tailstock 13 is exteriorly threaded and engages a tightening ring 201 which has sockets 202 therein so that a spanner wrench can be applied thereto. An annular flange 203 extends inwardly on ring 201 and engages the rear of wedge blocks 204 which may be made of hard wood. The inclines on said wedge blocks engage a mating tapered surface 205 on the inside of portion 200 of sleeve 173. The surface of the blocks 204 bearing against the exterior of tool 67 thereby provide a frictional grip between the tool and sleeve 173 of selective magnitude dependent upon the degree to which the ring 201 is tightened. Enough of a grip can be developed between the wedge block segments 204 and tool 67 to constantly keep the seal mechanism 167 and its component parts pressed together and against the face 174 of work 68 with sufficient force to maintain the fluid passing into the interior of collar 172 from leaking out at any of the sealed joints. Moreover, even if the fluid should be introduced under pressure before ring 201 is sufficiently tightened to effect the proper frictional grip, the retainer plate 196 acts as a safeguard to prevent any material loss of fluid under pressure because the extent of possible movement of plate 196 toward the adjacent face of saddle 43 is less than the axial overlapping distance, for example, of flange 190 and hub 191. Further, fluid under pressure within the collar 172 tends to exert force to separate cap 171 and collar 172 on the one hand and sleeve 173 on the other hand rather than having any tendency to move cap 171 and collar 172 away from face 174. This feature occurs because the distance from the opening 177 to seal 185 is greater than the distance from that opening to seal 181. Further, the shoulder 190*a* tends to press collar 172 towards cap 171. Thereby, the integrity of the seals on the two ends of cap 171 and on the two ends of collar 172 are maintained. Normally, however, the movement of tool 67 and the grip between the wedges 204 and that tool will maintain the entire sealing assembly 167 in sealing and seal maintaining relation.

The tool 67 comprises a hollow shaft 206 in addition to the head 179 and a knurled thread protector 207. The end of shaft 206 toward work 68 is externally threaded for engagement with the internal threads in head 179 while the shaft 206 is internally threaded at that end extending into housing 34. If, a length of work to be trepanned or cored should be longer than a single length of the shaft 206, the knurled thread protector 207 can be removed after the original length of tool has been advanced toward and into the work as far as it will go so that an additional length of tool shaft can be connected to the first length 206. After such an extension, it would be the end of the second length which would extend into housing 34 and which would be tightly clamped in tailstock 13.

The head 179 is slightly larger than shaft 206 and has an internally and rearwardly spiraling surface 208 to assist in conducting the metal cut in a coring operation away from the head 179 and rearwardly through the hollow center of the shaft 206 into the housing 34. A tool bit 209 having a sintered tungsten carbide tip 210 properly ground and undercut is held in socket 211 in head 179 by a set screw 212 so that the cutting surfaces of bit 209 are generally normal to the surface being cut. Dovetailed grooves 213 are provided around the periphery of head 179 at spaced intervals and have therein lands 214 with hardened steel inserts 215. A gap portion 216 in the exterior periphery of head 179 adjacent the surface 208 provides a further channel for fluid.

The fluid enters through opening 186 and passes to the exterior of head 179 through the clearance between the opening 177 and the exterior of shaft 206 and the spaces around the periphery of head 179 at the gap 216 and adjacent the lands 214 to constantly bathe the zone of contact between bit 209 and the metal being cut to form the kerf in work 68.

A central axial opening 217 in head 179 as well as the diameter of the interior of shaft 206 is sufficient to accommodate the relative rearward movement therethrough of the core 218 produced in the cutting operation and of the metal chips created by such cutting, except that the chips are carried entirely through the length of hollow shaft 206 and into housing 34. The maximum diameter of the most outwardly extending parts of head 179, to wit, the crests of the inserts 215 and the outermost side edge of bit 209 fit within opening 177 in such a manner that the opening 177 precisely guides head 179 in the initial starting of a cutting operation. Such starting is as a general rule at a slower rotational speed of the work relative to the tool. Further, the axial feeding rate of the tool relative to the work will generally be lower than during the remainder of the cutting operation. In these ways, during the aligned entry of tool 67 into the work, shock between the tool and the work will be substantially avoided and, by virtue of the variable control provisions obtainable through panel 14, the operation can be speeded up after the tool is fairly entered without stopping the operation. Stopping of the tool in the course of a trepanning operation is to be avoided since it would be likely to break the tool. Once entered, the extremely rigidly held alignment of the respective cooperating parts will prevent any eccentricity in the course of a cutting operation, and, because of the improvements employed, may permit finishes as close to specification as two one-thousandths of an inch rather than the more common fifteen one-thousandths. As shown in Figure 16 the radial distance between core 218 and surface 219 is the radial thickness of the kerf cut by tool bit 209 in the course of a cutting operation.

At the commencement of a cutting operation after the equipment has been set up, the self-priming pump and motor assembly 24 is started and maintained until an operable quantity of such liquid to run the pump and motor assembly 23 is available and thereafter responsive to the proper column of buttons on the panel 14. The fluid in the form of a liquid is taken from sump 93 through a suction pipe 220, which may have a screened inlet, first by the assembly 24 and then by assembly 23. A multistage centrifugal pump 221 is included in assembly 24 and has at its discharge port 222 a wide variation in pressure made available by controlling the speed of motor 223 from panel 14. The platform 20 is placed on track 22 so that the pressure hose 189 is connected at one end to port 222 and at the other to nipple 187 through union 188 and has a relatively short reach. In all positions of platform 20 on the rails 22 and of collar 172 with respect to the work that can be accommodated in lathe 10, the liquid circulation circuit remains unchanged and, during the travel of tailstock 13, leg 89 always remains over trough 90. Similarly, suction pipe 220 which may be flexible in part always remains in contact with the liquid in sump 93. The liquid passing through pressure hose 189 acts as a cooling medium and may be an oil or an oil-containing emulsion. That liquid also has a number of other functions such as furnishing lubrication between the tool head 179 and the work 68 being trepanned. In addition, the liquid is a carrier to flush out and carry away the chips created at the cutting surface area at the end of the kerf around the edges of the tool bit 209, the liquid flowing to the cutting zone around the outside of tool 67 and returning from it between the inside of the hollow tool 67 and core 218 to be discharged into housing 34 as earlier described. The gauge group 27 and the chip inspection opening 35 at all times permit an operator to keep before him and maintain proper coolant liquid volume, pressure and temperature conditions, the rotational speed of the work and axial feed of the tool required for best cutting performance.

In the course of such cutting, tailstock 13 is advanced toward the work 68 as previously described. The hydraulic liquid for running hydraulic prime mover 103 is drawn out of a tank 224 through a screened inlet 225 whence it flows through a pipe 226, pump 109, pipe 227, valve 101, motor 103 and exhaust pipe 228 before returning to tank 224. A relief valve 229 is provided in the hydraulic circuit to relieve any excessive pressure by bypassing a portion of the hydraulic liquid through pipe 230 to the tank 224. As noted earlier, the position of the movable parts in hydraulic valve 101 will determine the direction of flow of hydraulic fluid through motor 103 and hence the direction of rotation of the gear 104.

In some cases, as when setting a job up or when a second length of hollow tool shaft is added to make a tool like tool 67 longer to complete a cutting operation, spindle 17 may not be rotating, in which case pump 109 will not be effective, there may be a need to move tailstock 13 relatively slowly in one direction or the other. For such purpose, an auxiliary electric motor 231 with no material drift with an associated hydraulic pump 232 may be provided and connected in parallel with pump 109, the motor 231 being separately controlled by an electric jog button mounted on panel 14. The use of motor 231 and pump 232 as shown in Figure 6 will require the same valving of valve 101 by lever 99 as previously described for control of the direction of movement of tailstock 13 unless the lever 99 is in neutral position in which case any hydraulic liquid pumped by pump 232 will be returned to pipe 228 either through valve 101 or through its relief valve 233 or both. At all times, there is a control indication in that pressure of the hydraulic liquid in the hydraulic system is shown directly by gauge 33.

Normally, when a cutting operation is completed, the movement of tailstock 13 and of tool 67 in a withdrawing direction toward the right hand end of lathe bed 11 as shown in Figure 2 may be performed relatively rapidly. In that situation, clutch 25 can be disengaged by the operator and the proper button pushed on panel 14 is pushed placing the return movement of tailstock 13 under the control of motor 19 for relatively rapid withdrawal. On the other hand, with clutch 25 disengaged, the other button on panel 14 for motor 19 may be pushed to rapidly advance tailstock 13 toward spindle 17 as in the case of the setting up of a new job.

Figure 22:
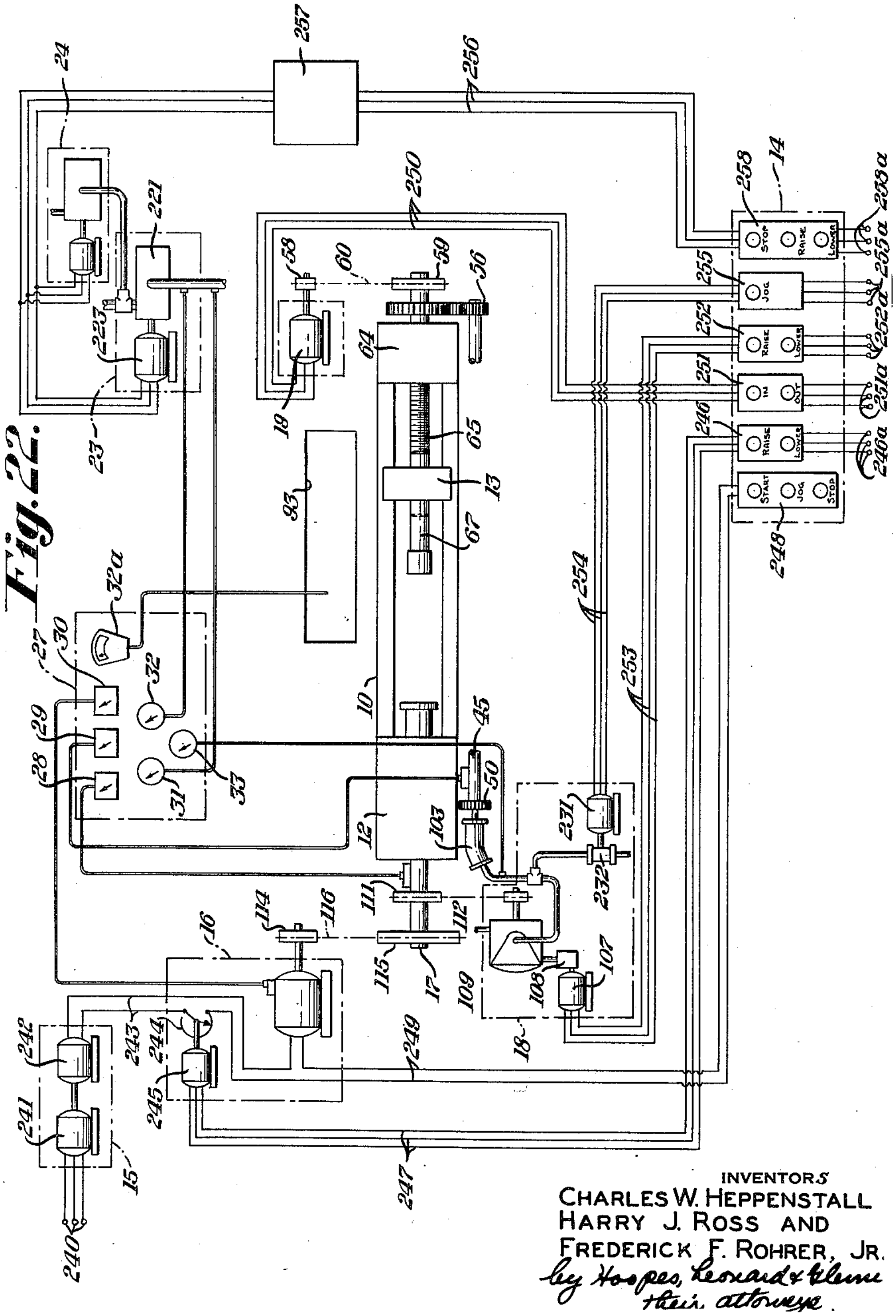
Figure 22 is a schematic diagram of an electrical network which may be used in operating the foregoing embodiment of this invention.

A schematic wiring diagram is shown in Figure 22 which may be used in effecting unitary control and regulation in the operation of the system of this invention. Power to take main drive motor 113 is supplied by a motor-generator set contained in assembly 15. A three-phase induction motor 241 in assembly 15 is connected to power source 240 and drives a generator 242 which in turn supplies direct electric current to main drive motor 113 in assembly 16 through circuit lines 243. The speed of main drive motor 113 and hence the rotational speed of work spindle 17, driven by motor 113 through pulley 114, endless band 116, and pulley 115 on spindle 17, is controlled and regulated by means of a motor operated rheostat 244 placed in circuit 243. Variations in speed are obtained through the operation of a reversible motor 245 which depending upon the direction of rotation will increase or decrease the electrical resistance through rheostat 244. The operation of motor 245 is obtained through suitable electrical connections in control box 246 located on panel 14 and connected to motor 245 by means of circuit lines 247. Main drive motor 113 may be stopped and started by means of controls in box 248 and circuit lines 249. The stop and start contacts in control box 248 are so constructed so that when either contact is depressed it will remain in its set position until the other is depressed at which time it will return to its original position, such switch devices being conventional. A jog contact is also provided in control box 248 to temporarily close circuit 249 and move motor 113 while an operator maintains a positive pressure on the contact button indicated, the contact being returned to an open position by suitable means such as a spring.

Reversible constant speed motor 19, which operates the rapid feed or withdrawal of tailstock 13 through pulley 59, endless band 60, pulley hub 58 and threaded shaft 65, is supplied with power through circuit lines 250 and is controlled by suitable electrical connections in control box 251. Thus, when the lathe operator desires a relatively rapid return of tailstock 13, as compared to that obtained through the rotation of shaft 45, he may, after disengaging clutch 25 press the "Return" contact button in box 251 which actuates motor 19 to rotate in the proper direction until the operator releases the button. A similar rapid advance toward spindle is obtained by pressing the "Advance" button which also actuates motor 19 in a reverse direction to rotate shaft 65 in the opposite direction.

In the hydraulic circuit, variation in the rate of flow of hydraulic liquid supplied to hydraulic motor 103 through pump 109 and hence the speed of hydraulic motor 103 is obtained by varying the piston displacement in pump 109 by means of a reversible electric motor 107 and gear reducer 108. Motor 107 is controlled through conventional relay box 252 in circuit 253, its operation being similar to that described for motor 245 and circuit 247. Rotation of motor 107 in one direction will increase the piston displacement in pump 109 and hence will increase the amount of fluid supplied to hydraulic motor 103 while a reversed rotation of motor 107 will decrease the rate of flow of hydraulic liquid passing through motor 103.

Movement of tailstock 13 when spindle 17 is stationary may be obtained by means of pump 232 driven by motor 231, when clutch 25 is engaged. Motor 231 is connected to the power source by circuit lines 254 and is controlled by conventional electrical network relays in control box 255. Box 255 provides a jogging control whereby an operator will obtain movement at a relatively slower speed than that possible by motor 19, of tailstock 13 when driven by motor 231, pump 232, hydraulic motor 103 and shafts 45 and 65 so long as the "jog" contact button is held down. The direction of movement of tailstock 13 will depend upon whether lever 99 is in its extreme "up" or "down" position. Any positioning by motor 231 is extremely accurate.

The flow of coolant fluid is supplied by motor and pump assemblies contained in units 24 and 23 as previously described. The variable speed motors in units 24 and 23 may be connected to circuits 256 in parallel so as to be operable from the same power source. The motor in unit 24 will cut out when its priming function has been completed, unit 23 and the motor and pump contained therein being the main circulating power source for the coolant fluid. The rate of flow of the coolant fluid may be varied by changing the speed of motor 223 in unit 23 and hence the speed of pump 221 in unit 23. The speed of motor 223 may be varied by a conventional speed-changing transformer assembly 257 in circuit 256 controlled by contact buttons in box 258. Motor 223 having been started when the pump 221 had been suitably primed by the pump in unit 24 may have its speed increased by pushing contact button marked "Raise" in box 258 the speed gradually increasing until the desired rate of coolant flow is attained. Upon release of the "Raise" contact the motor 223 will continue to run and maintain the desired speed. Should the operator desire to decrease the rate of coolant flow, he may press the "Lower" contact button in box 258, which, through circuit 256 and assembly 257 will gradually decrease the speed of the motor 223 until the speed of rotation has been reduced to that which will give the desired rate of flow from pump 221. Upon completion of the trepanning operation, it is desirous to quickly stop the flow of coolant liquid which may be done by depressing the "Stop" contact in box 258 to open circuit 256 and stop motor 223 and its corresponding pump 221. Suitable tachometer generators are connected to the drive for spindle 17 and to the drive for shaft 65 through shaft 45 when the clutch 25 is engaged, respectively, to operate gauges 28 and 29 through suitable electrical connections thereto. Gauge 30 is connected across the field of main drive motor 113 to record the power load in percent of full load thereon. Suitable pressure taps are shown connected between the respective gauges 31 and 33, and, the outlet of pump 221 and the high pressure side of pump 109, or 232 as the case may be. A suitable metering device, not illustrated, is connected to gauge 32 as schematically shown in Figure 22 to record the flow rate of coolant liquid circulated. Terminals respectively numbered **246*a*, 251*a*, 252*a*, 255*a* and 258*a*** are suitably connected to respective power sources to energize the circuit lines to which they are respectively related as shown in Figure 22.

The new system of this invention for trepanning or the like will not only be applicable to new assemblies but also can be applied to existing equipment heretofore used for other purposes. Further, changes may be made in details of this invention without departing from the spirit thereof or the scope of the appended claims.

We claim:

1. In a lathe system or the like having a lathe bed, a headstock, work connected to said headstock, a tailstock, a cutting tool connected to said tailstock in alignment with the center of said work, means for rotating said work relative to said tool and axially moving one toward the other, in combination, a cap to be connected to said work for rotation therewith, a non-rotating collar substantially abutting said cap and surrounding said tool in radially unobstructed spaced relation thereto around substantially the entire circumference of said tool, ring seal means engaging said work and said cap, said seal means being spaced from the exterior of said tool, sealing means for the space between said collar and said tool, and means for introducing a fluid under pressure into the interior of said collar between said seal and said sealing means, said collar having surfaces transverse to the axis of said tool with the larger of said surfaces facing away from said work to press said collar toward said work when subject to said fluid pressure.

2. In a lathe system or the like as set forth in claim 1, said cap having an opening in the center thereof for the passage of said tool, the internal diameter of said opening corresponding closely to the greatest external diameter of said tool, the length of said opening providing a support for said tool as cutting begins, and means for moving said tool axially toward said work, whereby said opening in said cap pilots said tool in the entry of said tool into said work.

3. In a lathe system or the like having a lathe bed, a headstock, work connected to said headstock, a tailstock, a hollower interior cutting tool connected to said tailstock in alignment with the center of said work, means for rotating said work relative to said tool and moving one toward the other, in combination, a cap for said work, a non-rotating collar substantially abutting said cap and surrounding said tool and spaced therefrom in radially unobstructed spaced relation thereto around substantially the entire circumference of said tool, sealing means interposed between said cap and said work, further ring sealing means for the respective ends of said collar, sleeve means longitudinally spaced from said work and on the other side thereof for frictionally pressing said collar toward said work when said tool is being fed toward said work, said collar being axially movable relative to said sleeve means, and means for introducing liquid under pressure into the interior of said collar and between said tool and said work, said first-mentioned sealing means being spaced from the exterior of said tool to permit said liquid to reach the place of contact between said tool and said work.

4. In a lathe system or the like having a lathe bed, a headstock, work connected to said headstock, a tailstock, a hollow interior cutting tool connected to said tailstock in alignment with the center of said work, means for rotating said work relative to said tool and moving one toward the other, in combination, a collar surrounding said tool and spaced therefrom in radially unobstructed relation thereto around substantially the entire circumference of said tool, means including a ring seal extending between said collar and said work and adapted to permit relative rotation therebetween, a sleeve surrounding said tool on the other side of said collar and pressing said collar toward said work when said tool is being moved in that direction, ring sealing means between said sleeve and said collar, means for frictionally holding said sleeve to said tool, means for adjusting said last-mentioned means to vary said frictional hold, said collar being axially movable relative to said sleeve, and means for introducing liquid under pressure into the interior of said collar between said sleeve and said work, said first-mentioned sealing means being spaced from the exterior of said tool to permit said liquid to reach the place of contact between said tool and said work.

5. In a lathe system or the like as set forth in claim 4, a saddle supported on said bed and positioned adjacent said work to slidably support said sleeve, and means to prevent said sleeve from backing out through said saddle.

6. In a lathe system or the like having a lathe bed, a headstock, work connected by a chuck to said headstock, a tailstock, an interior cutting tool rigidly connected to said tailstock in alignment with the center of said work, means for rotating said work relative to said tool and moving one toward the other, in combination, a cap affixed to and carried by said work having an opening therein for the passage of said tool to engage said work, a ring seal between said cap and said work, a non-rotating collar substantially abutting said cap and surrounding said tool and spaced therefrom in radially unobstructed relation thereto, a second ring seal interposed between said collar and said cap and adapted to be compressed axially therebetween in operation, said second ring seal having a greater inside diameter than said first-mentioned ring seal, a sleeve surrounding said tool between said collar and said tailstock, said sleeve being in frictional engagement with said tool and in slidable relation to the end of said collar away from said work, and a third ring seal between said sleeve and said collar, said third ring seal having a greater inside diameter than said second ring seal, whereby pressure fluid introduced into said collar tends to move said collar and cap toward said work.

7. In a lathe system or the like as set forth in claim 6, said second ring seal being an unbroken substantially rigid carbonaceous ring of generally polygonal section with planar faces normal to the axis of said tool and collar.

8. In a lathe system or the like, in combination, a lathe bed, a tailstock, a headstock, a work spindle journaled in said headstock, a prime mover for rotating said spindle, means for incrementally varying the speed of said prime mover, an endless band frictionally connecting said prime mover directly to said spindle for sensitive response of said spindle to the speed of said prime mover, a variable speed motor driven by said prime mover, a shaft to move said tailstock along said lathe bed, said motor being connected to said shaft, the other end of said shaft being free, a tool rigidly connected to said tailstock in alignment with said lathe and headstock, and central means for controlling the relative speeds of said prime mover and motor, whereby precise and corresponding adjustment of the relative speeds of said work and of the axial movement of said tool may be obtained with continuous application of the apropriate force required at the time being in an operation.

9. In a lathe system or the like as set forth in claim 4, a cantilever shaft immovable longitudinally and rotatably supported adjacent the end of said lathe and engaging said tailstock to move it and said tool axially relative to said work, the axis of said shaft generally lying closely adjacent a vertical plane passing through the central axis of said headstock, and a prime mover connected to said shaft to rotate it and push said tailstock and tool toward said headstock.

10. In a lathe system or the like, in combination, a lathe bed, a tailstock, a headstock, a work spindle journaled in said headstock, a prime mover for rotating said spindle, means for incrementally varying the speed of said prime mover, means connecting said prime mover to said spindle for sensitive response of said spindle to the speed of said prime mover, a variable speed motor driven by said prime mover, a shaft to move said tailstock along said lathe bed, said motor being connected to said shaft, a cutting tool rigidly connected to said tailstock in alignment with said lathe and headstock, and central means for controlling the relative speeds of said prime mover and motor, whereby precise and corresponding adjustment of the relative speeds of said work and of the axial movement of said tool may be obtained with continuous application of the appropriate force required at the time being in an operation.

11. In a lathe system or the like as set forth in claim 10, said shaft being immovable longitudinally and rotatably supported adjacent the end of said lathe, the other end of said shaft being free, and the axis of said shaft generally lying closely adjacent a vertical plane passing through the central axis of said headstock.

References Cited in the file of this patent

UNITED STATES PATENTS

| | | |
|---|---|---|
| 995,572 | Rowe | June 20, 1911 |
| 1,425,202 | Hibbard | Aug. 8, 1922 |
| 1,608,669 | Prydz | Nov. 30, 1926 |
| 1,799,518 | Lange et al. | Apr. 7, 1931 |
| 2,092,101 | Wickersham et al. | Sept. 7, 1937 |
| 2,182,263 | Probert | Dec. 5, 1939 |
| 2,240,795 | Morgan et al. | May 6, 1941 |